US007300533B2

(12) United States Patent
Lucero

(10) Patent No.: US 7,300,533 B2
(45) Date of Patent: Nov. 27, 2007

(54) METHOD AND APPARATUS FOR REPAIRING A WALL COVERING

(76) Inventor: Francisco Lucero, 1502 Betty La., Las Vegas, NV (US) 89110

( * ) Notice: Subject to any disclaimer, the term of this patent is extended or adjusted under 35 U.S.C. 154(b) by 0 days.

(21) Appl. No.: 11/084,419

(22) Filed: Mar. 18, 2005

(65) Prior Publication Data

US 2006/0207108 A1 Sep. 21, 2006

(51) Int. Cl.

| | |
|---|---|
| ***E04F 13/07*** | (2006.01) |
| ***E04F 65/00*** | (2006.01) |
| ***B29C 73/10*** | (2006.01) |
| ***B32B 43/00*** | (2006.01) |
| ***B32B 38/04*** | (2006.01) |
| *B26D 9/00* | (2006.01) |
| *B26B 3/08* | (2006.01) |

(52) U.S. Cl. .......................... 156/71; 156/98; 156/256; 83/515; 83/518; 30/178; 30/305

(58) Field of Classification Search .................. 30/178, 30/287, 289, 293, 305; 156/71, 94, 98, 248, 156/250, 256; 83/515, 518; D8/98, 107

See application file for complete search history.

(56) References Cited

U.S. PATENT DOCUMENTS

| | | | | |
|---|---|---|---|---|
| 3,513,048 A * | 5/1970 | Snyder | ........................ | 156/98 |
| 4,057,898 A * | 11/1977 | Piosky | ........................ | 30/289 |
| 4,501,069 A * | 2/1985 | Kohno | ........................ | 30/293 |
| 5,321,206 A * | 6/1994 | Hibler | ........................ | 174/66 |

* cited by examiner

*Primary Examiner*—Philip Tucker
*Assistant Examiner*—Sing P. Chan
(74) *Attorney, Agent, or Firm*—Weide & Miller, Ltd.

(57) ABSTRACT

A cutting implement has a body with a top and a bottom and one or more blades extending outwardly of the bottom and defining a closed cutting path. In one embodiment, the implement has a cutting depth control. The cutting implement is particularly useful in cutting sections of wall covering. In accordance with a method, the cutting implement is located adjacent a wall covering so that the blade(s) surround a damaged portion of the covering. Force applied to the top of the implement drives the blade(s) into the covering, creating a severed portion including the damaged area. The severed portion is removed and is preferably replaced by a replacement section of the same size cut with the implement from replacement wall covering.

16 Claims, 4 Drawing Sheets

METHOD AND APPARATUS FOR REPAIRING A WALL COVERING

FIELD OF THE INVENTION

The present invention relates to methods of repairing wall coverings such as wallpaper.

BACKGROUND OF THE INVENTION

Wallpaper is a very popular home decoration. Wallpaper comes in a variety of types and styles. Wallpaper generally comprises a relatively thin covering. A front side of the covering bears decoration, such as printing, texture or both. The opposing, rear side of the covering is generally planar and is configured to be adhered to a supporting surface. Generally, that surface is a wall, though wallpaper may be applied to ceilings, doors and other surfaces such as cover plates.

The wallpaper is connected to the wall or other support surface with adhesive. In some instances, an adhesive paste is prepared and applied to the rear side of the covering and then the covering is applied to the wall. In other cases, the wallpaper may have dried adhesive located on the rear side, and this adhesive may be whetted in order to activate it.

Wallpaper has the advantage over painting that complex designs and textures can be associated with a wall with relative ease. Unfortunately, a disadvantage to wallpaper and similar wall coverings is that when the covering is damaged, it is difficult to repair. When a painted wall is scuffed, scratched or the like, it can easily be repainted. Wall coverings however, may be ripped or torn. For example, the impact of a relatively sharp object with the wall covering may tear or rip a small area of the wall covering. In some instances, a small area of the wall covering may be torn lose, and in other instances an entire section may be removed or disassociated from the remaining wall covering.

A common technique for torn wall coverings is to attempt to re-attach, such as glue, the torn area back into place on the wall. Generally, however, the torn wall covering area is irregular in shape, and may be irregular in depth (i.e. a surface portion may peel away). This makes such a repair difficult without the interface or edge of the tear still being visible.

An improved method of repairing a wall covering is desired.

SUMMARY OF THE INVENTION

The invention is a cutting implement and a method of using a cutting implement. One method of the invention is a method of repairing a wall covering.

One aspect of the invention is a cutting implement comprising a body having a top and a bottom and one or more blades extending from the bottom of the body, the one or more blades defining a continuous closed cutting path around an area, whereby when the one or more blades are located adjacent a material to be cut and a force is applied to the top of the body generally in the direction of the bottom of the body, the one or more blades are driven into the material, cutting the material.

In one embodiment, the implement includes a handle which extends from the body for gripping by a user, such as for positioning the implement during use. In another embodiment, the implement includes a cutting depth control. The cutting depth control may comprise a plate or foot which is connected to the body and which is movable towards and away from the bottom. In one embodiment, the plate is mounted at one end of a threaded support which engages the body, and an input wheel is located at the other end. A user's rotation of the wheel rotates the threaded support, thus moving the plate towards and away from the bottom of the body, and thus towards and away from the edge of the blade(s), thus serving as a depth control.

The body may have various configurations. In one embodiment, the body is generally square in peripheral shape, having a generally planar top and bottom and four sides. The top may be smaller in area than the bottom. The one or more blades and/or body may be configured so that the one or more blades may be disconnected from the body and replaced, such as when worn. The one or more blades may be configured to define cutting paths of various shapes or patterns, such as square, round or triangular.

In accordance with a method, the cutting implement is located adjacent a material to be cut. A force is applied to the implement, preferably to the top of the body in the direction of the bottom of the body, to force the one or more blades into the material.

In one embodiment, the method of cutting is part of a method of repairing a wall covering having a damaged section. One such method comprises: (1) providing a cutting implement in accordance with the invention; (2) orienting the cutting implement so that the blade(s) are adjacent the wall covering and the damaged section is within the area defined by the blade(s); (3) applying a force to the cutting implement to drive the blade(s) into the wall covering and sever a severed portion of the wall covering including the damaged section from the surrounding wall covering; (4) removing the severed wall covering portion; (5) orienting the cutting implement so that the blade(s) are adjacent a replacement wall covering; (6) applying a force to the cutting implement to drive the blade(s) into the replacement wall covering to sever a replacement portion of the replacement wall covering from the surrounding replacement wall covering; (7) removing the replacement section of wall covering from the replacement wall covering; and (8) positioning the replacement section of wall covering in the location previously occupied by the severed wall covering portion.

In one embodiment, the severed wall covering portion is aligned with a corresponding portion of the replacement wall covering having the same appearance as the severed wall covering portion. The outline of the severed wall covering portion may be drawn or marked on the replacement wall covering to provide a guide for aligning the blade(s) of the cutting implement.

In accordance with the method, a precisely sized section of wall covering is removed and replaced with the same size replacement section, such that the edges of the replacement section and original wall covering mate precisely. In this manner, the substitution of the replacement section in the original wall covering is not visible.

Further objects, features, and advantages of the present invention over the prior art will become apparent from the detailed description of the drawings which follows, when considered with the attached figures.

DETAILED DESCRIPTION OF THE INVENTION

The invention is a method and apparatus for repairing a wall covering, including a cutting implement. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, one aspect of the invention is an apparatus for repairing wall covering. The apparatus comprises a cutting implement configured to cut and disassociate a section of wall covering from surrounding wall covering. Another aspect of the invention comprises a method of repairing a wall covering. In one embodiment, the method comprises removing a section of covering around and including a damaged section of wall covering, and replacing that section with a new undamaged section. The method is preferably performed with the aid of the cutting implement of the invention.

Figure 1:
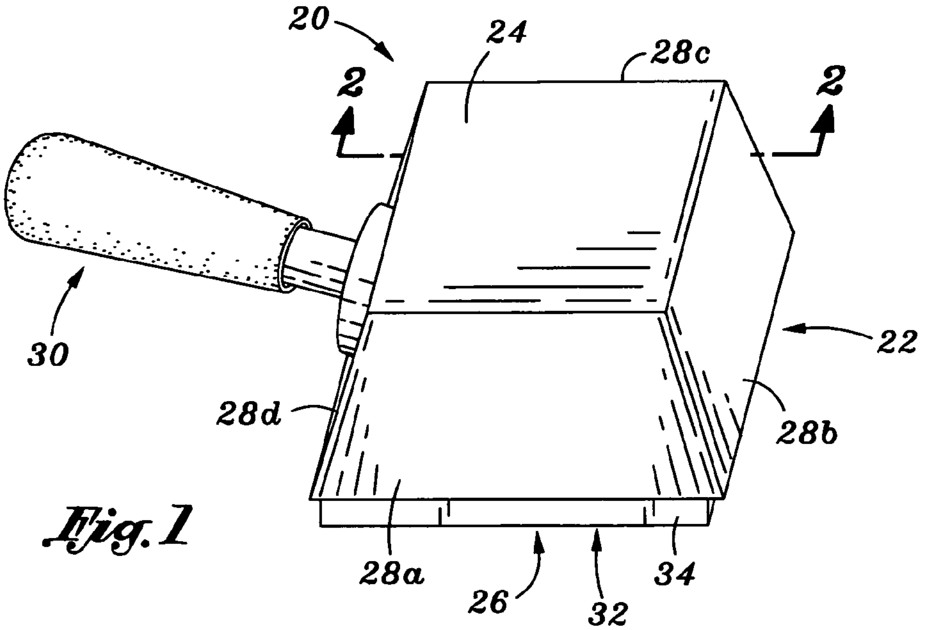
FIG. 1 is a perspective view of a wall covering cutting implement in accordance with an embodiment of the invention.

FIG. 1 illustrates a cutting implement 20 in accordance with an embodiment of the invention. The cutting implement 20 will generally be referred to as a wall covering cutter since one preferred use for the cutting implement is for cutting wall covering. It will be appreciated, however, that the cutting implement could be used to cut wide variety of materials, including but not limited to cloth, plastic and wood.

As illustrated, the cutter 20 comprises a body 22. The body 22 preferably defines a top 24 and an opposing bottom 26. In the embodiment illustrated, where the top 24 and bottom 26 are generally square in shape, the body 22 has four sides 28*a,b,c,d*. These sides 28*a,b,c,d* extend from the top 24 to the bottom 26 and define the perimeter of the body 22.

Figure 2:
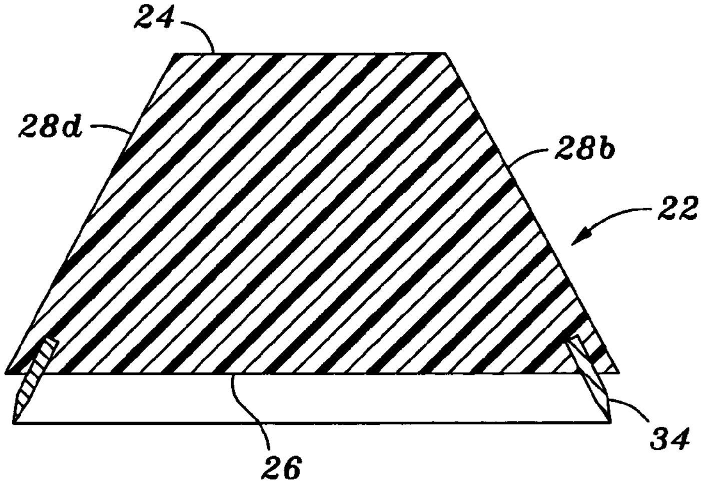
FIG. 2 is a cross-sectional side view of the wall covering cutting implement illustrated in FIG. 1.

Referring to FIG. 2, in one embodiment, the top 24 is smaller in dimension than the bottom 26. In this configuration, the sides 28*a,b,c,d* are sloped, leaning inwardly from the bottom 26 towards the top 24. As also illustrated in FIG. 2, in one embodiment the body 22 may be solid. The body 22 is preferably constructed from a durable material, such as plastic or metal. The body 22 may be molded, but may also be formed in other ways.

In a preferred embodiment, the cutter 20 includes a handle 30. In one embodiment, the handle 30 extends outwardly from one of the sides 28*b* (it may extend outwardly from any of the sides, not just the side illustrated). The handle 30 may have a wide variety of forms. In the embodiment illustrated, the handle 30 is an elongate grip which has a first end connected to the body 22. The handle 30 may be connected with a threaded connector, adhesive or other means. The handle 30 may comprise rod or similar element which, at one or more points there along, is covered with a gripping element, such as a rubber or plastic molded grip element which is configured to conform to the user's hand.

The cutter 20 includes a cutting element 32. In a preferred embodiment, the cutting element 32 defines and is configured to cut a closed segment or path which comprises the perimeter of a polygon. Preferably, the cutting element 32 defines a continuous closed cutting path (i.e. the cutting element has no gaps or relatively small gaps therein), and thus enclosed or surrounds an interior area.

In one embodiment, the cutting element 32 comprises one or more blades 34. In one embodiment, one or more blades 34 are arranged to define a square cutting path. Individual blades 34 may define the four sides of the square cutting pattern. In another configuration, a single blade may be constructed to have that shape.

The cutting element 32 preferably extends outwardly of the bottom 26 of the body 22. In one embodiment, the cutting element 32 is connected to and extends from the bottom 26 of the body 22. In other embodiments, the cutting element 32 may mounted to other parts of the body 22 such as the sides or even the top.

In one embodiment, the one or more blades 34 have a top and a bottom. At least a bottom of the blade(s) 34 preferably defines a cutting surface, such as a sharpened cutting edge. The top of the one or more blades may be configured for mounting of the blade(s) to the body 22. While the blade(s) 34 are preferably mounted to the bottom 26 of the body 22, as indicated above, they may be connected to other portions of the body, either directly or indirectly.

The one or more blades 34 may be connected to the body 22 in a variety of fashions. In one embodiment, a slot (not shown) may be formed in the bottom 26 of the body 22, that slot configured to accept a top portion of the one or more blades. One or more fasteners (not shown), such as one or more set screws, may be used to lock or secure the one or more blades 34 to the body 22. In another embodiment, the one or more blades may snap or press-fit into the slot.

The one or more blades 34 may be custom configured, or the body 22 may be configured to accept razor blades or other readily available cutting elements. In one embodiment, the one or more blades 34 may be connected to a mount (not shown), and the mount may be connected to the body 22. For example, the mount may comprise a generally rectangular frame having slots for accepting the one or more blades. The mount may also include one or more tabs for connecting the mount to the body 22. The mount may, for example, be connected to the body 22 with one or more threaded fasteners, clips or the like.

Preferably, at least the cutting surface or edge of the one or more blades 34 is constructed of a durable material, such as stainless steel. In one embodiment, the wall covering cutter 20 is configured so that the one or more blades 20 are replaceable so that when dull, they can be interchanged or removed and sharpened. In another embodiment, the wall covering cutter 20 may be configured as a disposable device. In that embodiment, the one or more blades 34 may be permanently connected to the body 22. For example, the one or more blades 34 may be molded into the body 22, such as when the body 22 is constructed of plastic. In such a embodiment, when the one or more blades 34 are dull or broken, as they are permanently fixed to the body 22, the entire wall covering cutter 20 may be disposed of.

In use, the wall covering cutter 20 is positioned with its one or more blades 34 adjacent a material to be cut, such as the surface of a wall covering. By adjacent, it is meant in close proximity or even in contact therewith. Force is applied to the top 24 of the body 22 of the cutter 20. Preferably this force is applied in a direction towards the bottom 26 of the body 22. This force maybe generated, for example, by hitting the top 24 of the body 22 with a hammer, mallet or other element, or by pressing the top 24 of the body 22. The force is transmitted through the body 22 to the one or more blades 32. The transmitted force causes the one or more blades 32 to penetrate the material to be cut, such as wall covering, thus cutting the wall covering.

Because the cutting element 32 of the cutter 20, such as the one or more blades 34, cut a closed path, the cutting action causes a segment or section of the wall covering to be completed disassociated or disconnected from the remaining wall covering. In particular, the portion of the wall covering located within the bounds of the one or more blades and thus the cutting path, is separated from the portion of the wall covering which is located outside of the bounds of the one or more blades and the cutting path.

One embodiment of the invention is a method of using the wall covering cutter of the invention to repair a wall covering. Such a method is described in greater detail below.

The cutting implement/wall covering cutter of the invention may have a variety of other configurations than illustrated in FIGS. 1 and 2. As described above, the one or more blades of the cutter are configured to cut a square pattern. In this configuration, when the cutter is used to cut a planar wall covering, the cutter will separate a square-shaped segment of material from the remaining portion of the covering.

The cutter may be configured to cut other patterns. For example, referring to FIG. 3, in one embodiment a cutter **20*a* may include one or more blades 34*a* configured to make triangular cut and thus cut a triangular-shaped wall covering section. In this configuration, the one or more blades 34*a*** are configured into a triangle.

Figure 3A:
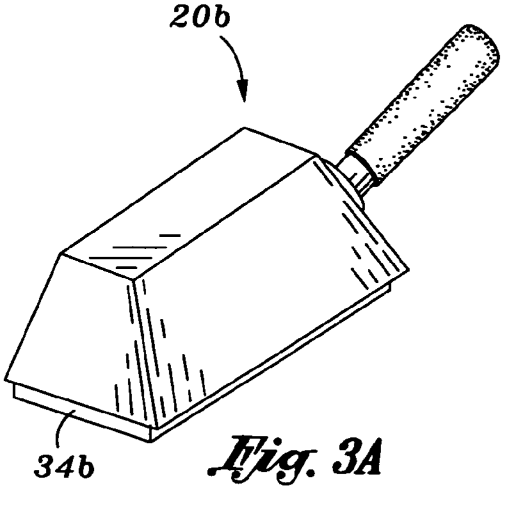
FIG. 3 is a perspective view of other embodiment wall covering cutting implement in accordance with the invention.
Figure 3B:
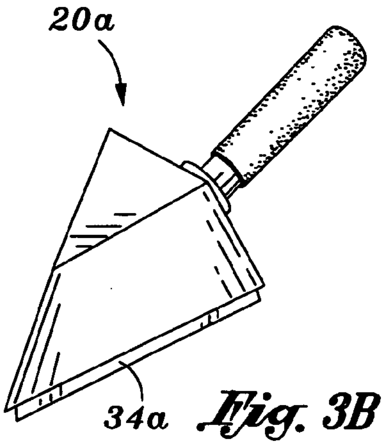

Similarly, FIG. 3 illustrates a cutter **20*b* having one or more blades 34*b* configured into a rectangle. In this configuration, the cutter 20*b*** cuts a rectangle-shaped wall covering section.

The one or more blades of the cutter of the invention may be configured to make cuts of other shapes. For example, the one or more blades may be configured to make a circular cut, or even an irregular cut.

In one embodiment, the body of the wall cover cutter has a shape which generally matches the blade pattern and thus the shape of the cutting path. For example, if the blade pattern is triangular, the body may be triangular in peripheral shape as well. This configuration has the advantage that the user is made aware of the cutting pattern just by looking at the body, and force applied to the body maybe symmetrically applied to the blade(s). It is also desirable for the size of the body (or at least the largest division thereof—the bottom is the embodiment illustrated) to be about the same size as the area defined by the blades. This aids the user in aligning the blades with area to be cut.

In other embodiments, the body may have a shape which is independent of the blade pattern. For example, the body may have a square shape and one or more blades defining a square, triangular, rectangular or other shape may be connected thereto.

As indicated, in a preferred embodiment, the area of the top 24 of the body 22 is less than that of the bottom 26. In general, it is advantageous for the surface area of the top 24 of the body 22 to be kept relative small, even if the size of the bottom 26 and size of the cutting path defined by the one or more blades 34 is large. It is also desirable for the top 24 of the body 22 or other surface which defines the force transmitting/impacting surface, to be aligned with a central axis through the body 22 and the bottom 26 and cutting path. In this configuration, when a force is applied to the top 24 the force is more likely to be evenly distributed to the cutting element along the cutting edge or path thereof. If, for example, the top 24 is very large, application of force towards one edge may result in uneven force being applied to the cutting element, thus potentially resulting in cutting action along one portion of the element but insufficient force to providing cutting action along other portions of the element.

Figure 4:
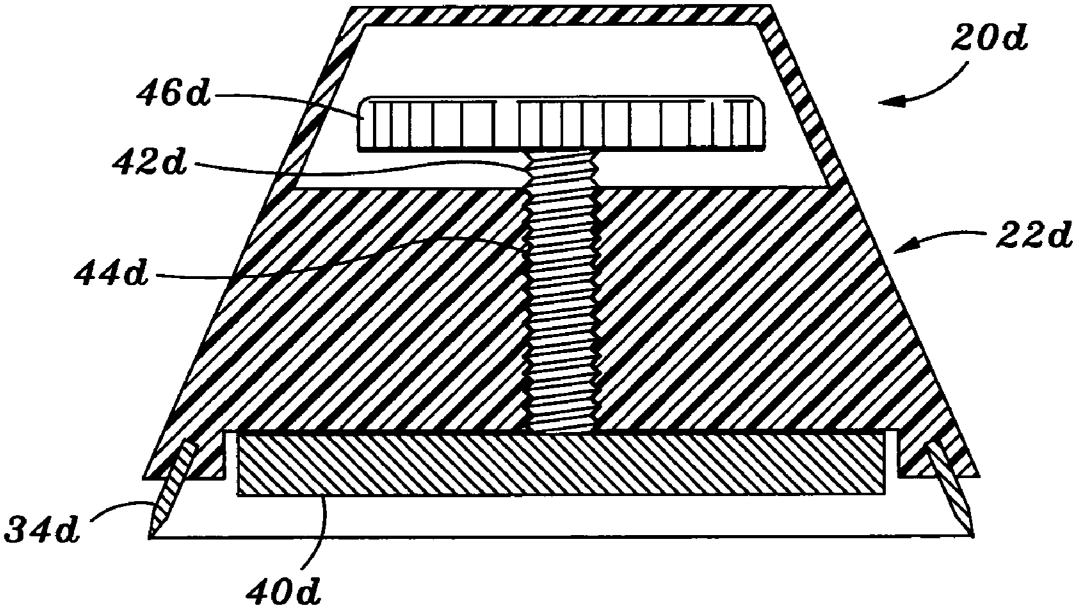
FIG. 4 is a cut-away view of a body of another embodiment wall covering cutting implement in accordance with the invention.
Figure 5:
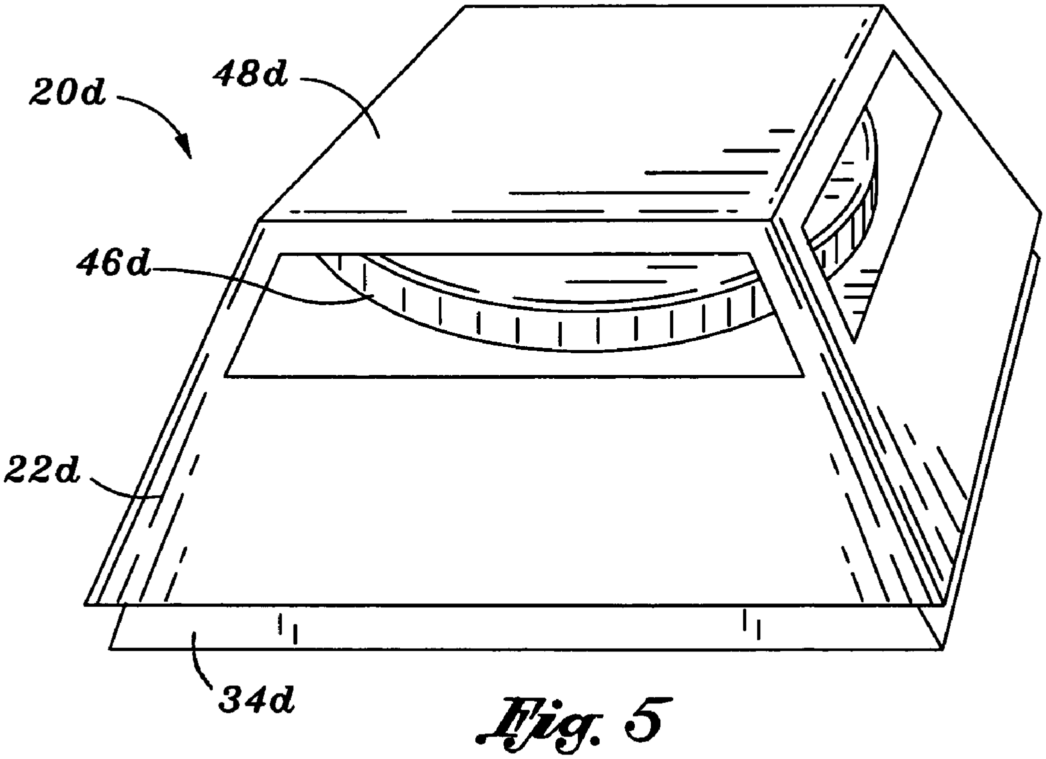
FIG. 5 is a top perspective view of a wall covering cutting implement as illustrated in FIG. 4.

In one embodiment of the invention, the wall covering cutter may include means for adjusting or controlling the depth of cut. Referring to FIGS. 4 and 5, one embodiment of such a wall covering cutter **20*d* is illustrated. This wall covering cutter 20*d* is similar to that described above, including a body 22*d*, one or more blades 34*d***, and preferably a handle (not shown).

In this embodiment, a stop **40*d* is located at the bottom 26*d* of the body 22*d*. Preferably, this stop 40*d* is movable relative to the bottom 26*d* of the body 22*d* and thus the one or more blades 34*d* connected thereto. In one embodiment, the stop 40*d* is connected to a threaded shaft 42*d* or other support which engages mating threads formed in a passage 44*d* through the body 22*d*. The stop 40*d* is connected to one end of the shaft 42*d*. A thumb-wheel 46*d* or other input element is preferably located at the opposing end of the shaft 42*d***.

In one embodiment, the thumb-wheel **46*d*, or at least one or more peripheral portions thereof, is accessible by the user. As illustrated, in one embodiment the wheel 46*d* is located at the top of the body 22*d*. A cover 48*d* may be positioned over the wheel 46*d* for protecting the wheel and defining a force transmitting member, with force applied thereto transmitted to the body 22*d*. The cover 48*d* may cooperate with the body 22*d* to define one or more openings or window through which one or more portions of the wheel 46*d*** may extend for engagement by the user.

The stop **40*d* may have a variety of forms. In one embodiment, the stop 40*d* comprises a plate or foot. In use, a user may rotate the wheel 46*d*, thus causing the shaft 42*d* to turn. When the shaft turns 42*d*, the stop 40*d* is raised or lowered (depending upon the direction of rotation of the shaft 42*d*). In order to reduce the depth of cut, the user preferably lowers the stop 40*d* so that a bottom surface thereof extends outwardly from the body 22*d* nearly the same distance as the cutting edge of the one or more blades 34*d*. In order to increase the cutting depth, the user raises the stop 40*d* towards the body 22*d***.

In use, the wall covering cutter **20*d* is forced into contact with a wall covering. The one or more blades 34*d* penetrate the wall covering until the stop 40*d*** contacts the wall covering and limits further penetration of the wall covering by the one or more blades. The depth control feature is useful in preventing the one or more blades from penetrating beyond the wall covering, such as into the wall or other supporting structure.

Other means may be used to adjust the depth of cut. In one embodiment, the stop **40*d* may be removable. Stops 40*d* of varying thickness may be connected to the body 22*d*. By changing the thickness of the stop 40*d***, the depth of cut may be varied.

Other means may be provided for moving the stop **40*d* when the stop is configured to be movable. For example, a simple lever may be connected to the shaft 42*d*, movement of the lever causing rotation of the shaft 42*d*, and thus the stop 40*d*. The bottom of the body 22*d* may also be formed with inset areas of varying depth. The stop 40***d* may be rotated upon a shaft to that it engaged or fits one of those insets. Shims or other elements may also be positioned between the stop 40*d* and the body 22*d* in order to control the distance between the stop 40*d* and the body 22*d*.

In one embodiment, the depth of cut may also be controlled by changing the distance by which the one or more blades 34*d* extend from the body 22*d*. For example, the one or more blades 34*d* may be connected to the body 22*d* with one or more screws. The one or more blades 34*d* may be locked into position at various depths by using the one or more screws. In other embodiments, the actual height of the one or more blades 34*d* may be varied depending upon the desired application.

The embodiment depth control illustrated has the advantage that it provides a wide range of depth control with no need to substitute or replace parts.

One embodiment of the invention is a method of repairing a wall covering. This method preferably involves use of a cutting implement in accordance with the invention.

Figure 6A:
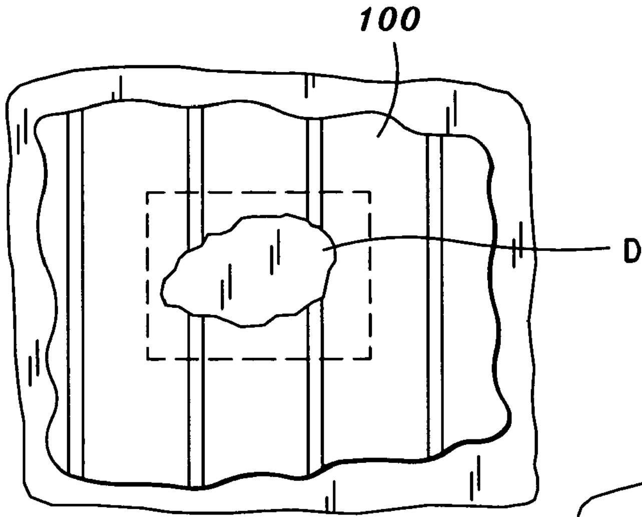
FIGS. 6A-6F illustrate a method of repairing a damaged area of wall covering in accordance with an embodiment of the invention.

One embodiment of such a method will be described with reference to FIGS. 6A-6F. FIG. 6A illustrates a wall covering 100. As indicated above, the wall covering may be of a variety of types. As illustrated, the wall covering has damaged section D. In the example illustrated, a section of the wall covering has been torn, actually partially separating from the remaining wall covering and the supporting structure. Of course, other types of wall covering damage may occur.

Figure 6B:
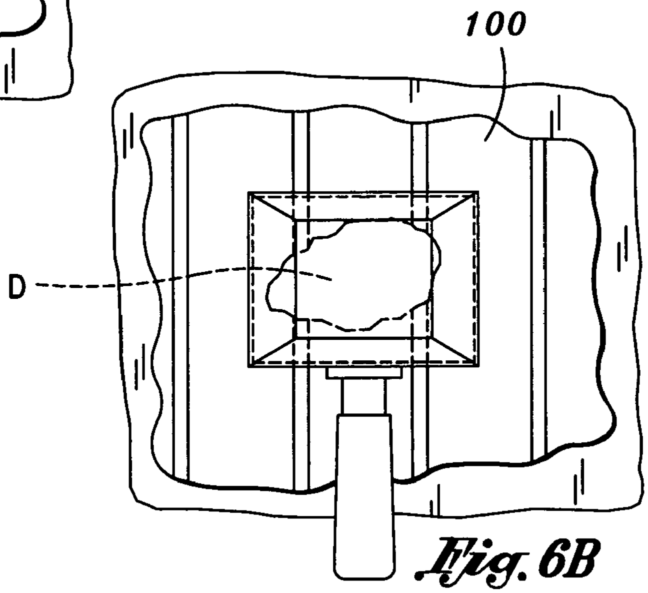

Referring to FIG. 6B, a wall covering cutter in accordance with the invention is preferably positioned adjacent the wall covering. Preferably, the wall covering cutter is positioned so that the one or more blades of the cutter surround the damaged section D—i.e. the damaged section D is located within the cutting path and area defined by the blade(s). Force is then applied to the cutter, such as by impacting the top of the body of the cutter with hammer or mallet, in order to drive the one or more blades into the wall covering.

Figure 6C:
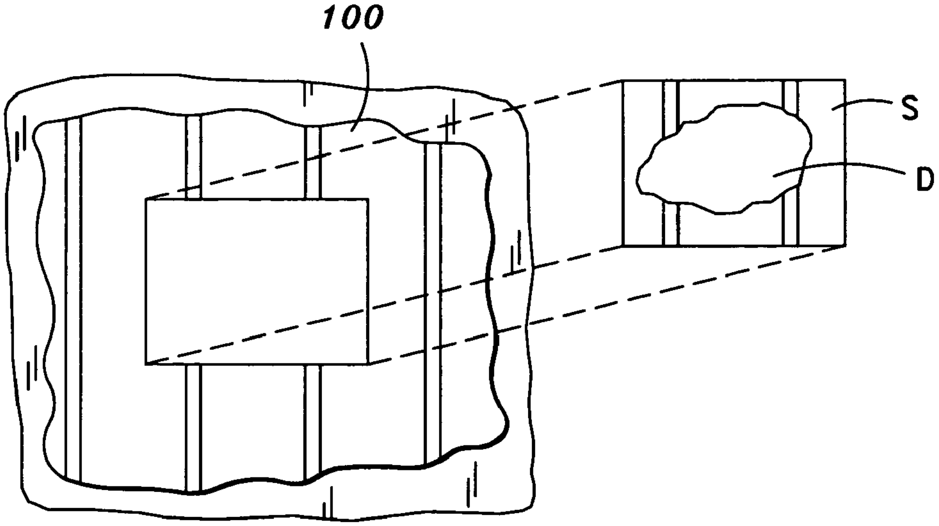

The cutting action cuts or disassociates a section of the wall covering around the damaged section D from the remaining portion of the wall covering. Referring to FIG. 6C, this section S, which may be referred to as a severed section, which section includes the damaged section D, is then removed. While the cutting action may separate a section of wall covering from the remaining wall covering, the severed section may still be adhered to the wall or other support surface. Thus, water, adhesive dissolver or other material may be applied to aid in removal of the cut section from the wall. As illustrated, once the severed section is removed, the wall or other surface is exposed.

Figure 6D:
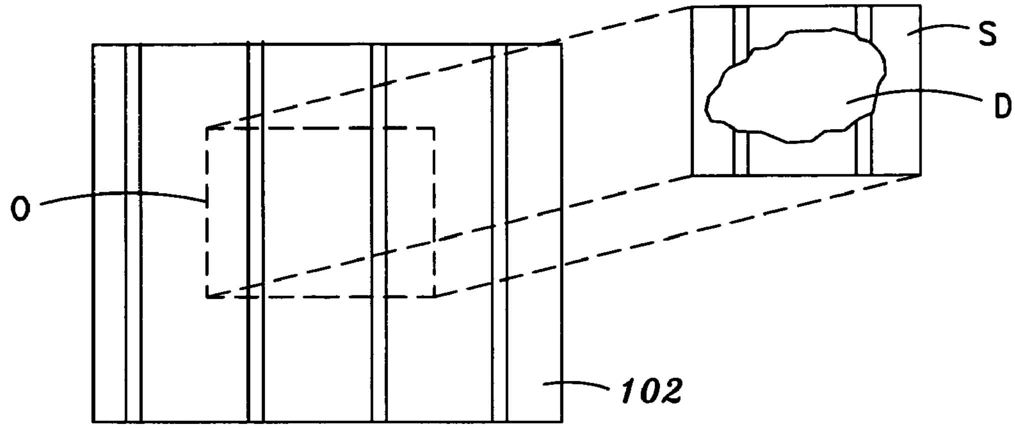

In a preferred embodiment, the severed sections is then positioned adjacent or over a replacement section of wall covering 102. In the event the wall covering is printed or otherwise displays or bears a pattern, the removed severed section is preferably aligned with a matching section of the replacement wall covering. The replacement wall covering 102 is preferably then marked, such as by outlining 0 the edge of the removed severed section on the replacement wall covering with a pencil, as best illustrated in FIG. 6D.

Figure 6E:
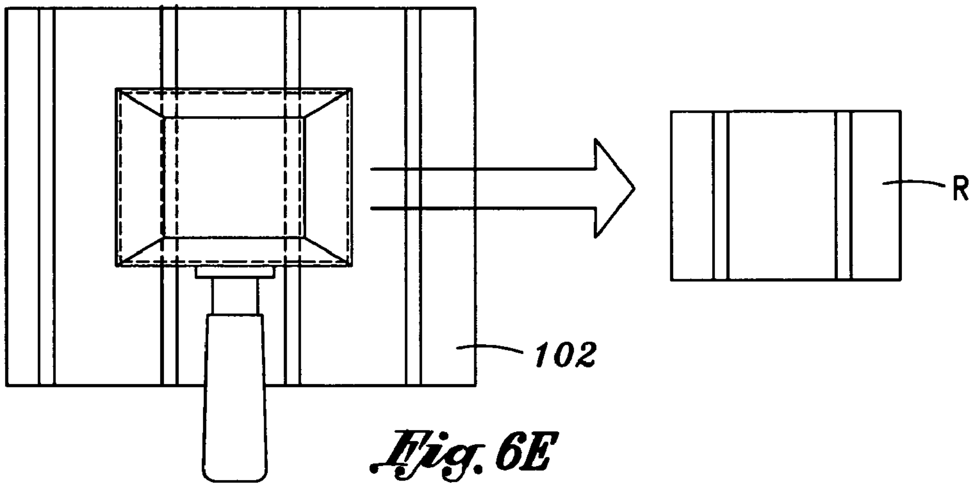

Referring to FIG. 6E, the wall covering cutter is then positioned adjacent the replacement wall covering 102. Where the replacement covering 102 has been marked, the cutter is positioned so that the one or more blades are aligned with the markings. The cutter is then forced into the replacement covering to cut a replacement section R. As illustrated, this replacement section R is removed from the remainder of the replacement wall covering 102.

Figure 6F:
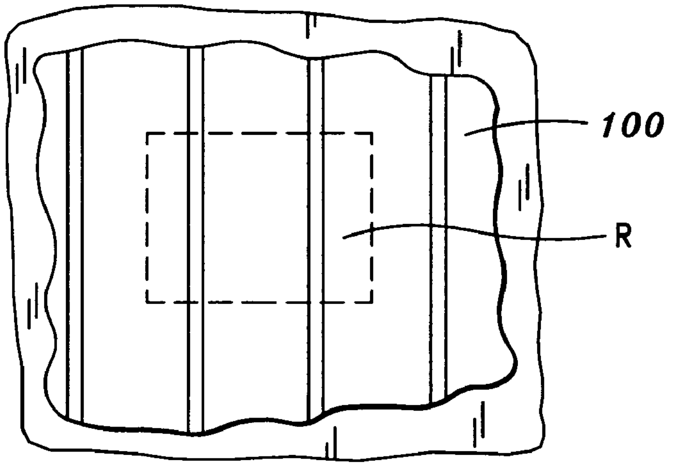

Referring to FIG. 6F, the replacement section R is then aligned with the exposed area in the original wall covering where the severed section was removed, and is adhered to the wall or other support surface. This may be accomplished with the aid of a wall paper adhesive or other means of attachment.

The method of the invention has numerous advantages. First, the wall covering cutter is effective in accurately cutting an area of wall covering from another section of wall covering. Thus, the wall covering cutter can be used to cut a section of wall covering which is damaged from the remaining wall covering. The manner of cutting prevents tearing and other damage to the wall cover in the process of disassociating the damaged section of wall covering from the remaining wall covering.

In addition, the wall covering cutter is effective in cutting a replacement section of wall covering to the same exact size and shape as the size and shape of the section which was cut for removal. In this manner, the replacement section has sharp edge and fits exactly into the space previously occupied by the removed section.

Because of the sharp cuts and exact duplication (in shape/size) of the removed and replacement wall covering sections, the outer edges of the replacement wall covering section exactly fit and align with the edges of the original wall covering where the damaged section was removed. Thus, when the replacement section is inserted, it perfectly mates with the original wall covering section and the no seams or edges are visible.

Advantageously, because a particular area of wall covering is removed from around the damaged section, the removed section can be used as a template against the replacement wall covering. In this manner, it can be assured that when the replacement section is cut, it is a portion of the replacement wall covering which contains or displays the exact area or portion of the printed pattern or the like which is born by the removed section.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of repairing a wall covering having a damaged section comprising the steps of:

providing a cutting implement comprising a body having a top and a bottom and one or more blades extending outwardly of said bottom of said body, said one or more blades having a cutting edge forming a closed cutting area;

adjusting a depth adjustment feature of said cutting implement to a desired cutting depth;

orienting said cutting implement so that said one or more blades are adjacent said wall covering and said damaged section is within said closed cutting area defined by said one or more blades;

applying a force to said top of said body of said cutting implement to drive said one or more blades into said wall covering and in a single cutting action sever a severed portion of said wall covering including said damaged section from the surrounding wall covering;

removing said severed wall covering portion;

orienting said cutting implement so that said one or more blades are adjacent a replacement wall covering;

applying a force to said top of said body of said cutting implement to drive said one or more blades into said replacement wall covering to sever in a single cutting action a replacement portion of said replacement wall covering from the surrounding replacement wall covering;

removing said replacement section of wall covering from said replacement wall covering; and positioning said replacement section of wall covering in the location previously occupied by said severed wall covering portion.

2. The method in accordance with claim 1, including the step of aligning said severed wall covering portion with a corresponding portion of said replacement wall covering having the same appearance as said severed wall covering portion.

3. The method in accordance with claim 2, wherein said severed wall covering portion bears a pattern and said severed wall covering portion is aligned with a portion of said replacement wall covering bearing the same pattern.

4. The method in accordance with claim 2, wherein said step of orienting comprises orienting said one or more blades in alignment with said corresponding portion of said replacement wall covering.

5. The method in accordance with claim 2, further comprising the step of marking an outline on said replacement wall covering using one or more edges of said severed wall covering portion as a template while aligned with said corresponding portion of said replacement wall covering.

6. The method in accordance with claim 5, wherein said step of orienting comprises orienting said one or more blades in alignment with said outline of said replacement wall covering.

7. The method in accordance with claim 1, wherein said one or more blades define a generally square cutting area and said severed portion of wall covering and said replacement section of wall covering are generally square in shape.

8. The method in accordance with claim 7, wherein said wall covering comprises wall paper affixed to a wall.

9. The method in accordance with claim 1, wherein said one or more blades are releasably attached to said bottom of said body.

10. The method in accordance with claim 1, wherein said one or more blades are integrally formed with said body and extend from said body.

11. The method in accordance with claim 1, wherein said one or more blades forming a closed cutting area having a cutting edge that follows a peripheral shape of said body of said cutting implement.

12. The method in accordance with claim 11, wherein said peripheral shape is triangular.

13. The method in accordance with claim 11, wherein said peripheral shape is circular.

14. The method in accordance with claim 1, wherein said depth adjustment feature comprises an adjusting wheel, a stop and a shaft connecting said adjusting wheel and stop, said stop positioned adjacent said one or more blades to control a depth of cut, and wherein said adjusting wheel, said shaft and said stop are operatively connected with said body such that upon a rotation of said adjusting wheel said stop is moved towards or away from said body depending upon a direction of said rotation of said adjusting wheel.

15. The method in accordance with claim 1, wherein said depth adjustment feature comprises at least a first and a second removable stop, said first removable stop having a first predefined thickness and wherein when said first removable stop is associated with said body said one or more blades cut to a first cutting depth, and said second removable stop having a second predefined thickness, and wherein when said second removable stop is associated with said body said one or more blades cut to a second cutting depth.

16. The method in accordance with claim 1, wherein said step of adjusting comprising modifying the distance by which said one or more blades extend outwardly from said bottom of said body.

* * * * *